March 3, 1964   H. S. LEWIS ETAL   3,123,683
CYCLICALLY OPERATED SWITCH CONTROL APPARATUS
Filed May 12, 1961
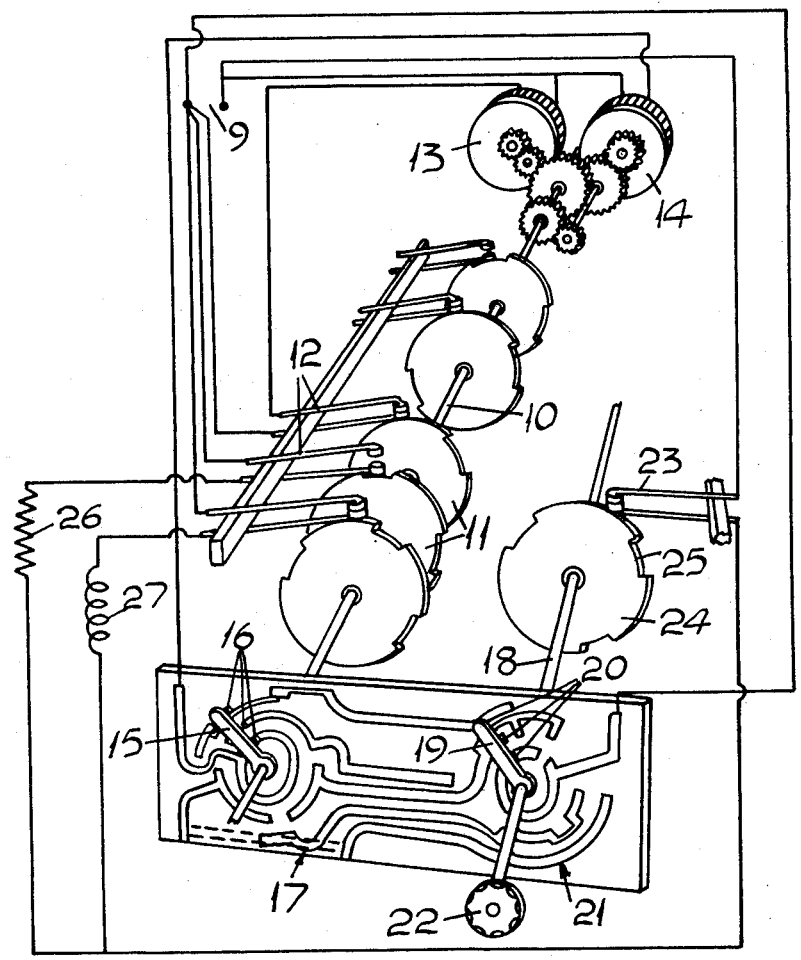

United States Patent Office 3,123,683
Patented Mar. 3, 1964

---

3,123,683
CYCLICALLY OPERATED SWITCH CONTROL APPARATUS
Harry Stanley Lewis and Francis McGuirk, Birmingham, England, assignors to Chamberlain & Hookham Limited, Birmingham, England
Filed May 12, 1961, Ser. No. 109,632
2 Claims. (Cl. 200—38)

This invention relates to cyclically operated switch control apparatus of the kind in which a plurality of electric switches are operated in a predetermined cycle by means of a plurality of rotatable cams or like members.

One form of such apparatus is described in our co-pending patent application Serial No. 109,630 dated May 12, 1961, and is intended, in one application, for use in controlling the sequence and duration of operations carried out in a machine such as a domestic, electrically operated washing machine, although it is to be understood that the apparatus can also be used for other control purposes.

In operating washing machines and other machines a normal cycle may include several different operations which are carried out for a predetermined time. However, in certain circumstances, it may be desirable to alter the cycle of operations so that, for example, some operations are omitted or speeded up or slowed down. For normal operation, the switch control means may be driven by power-operated driving means such as an electric motor and speed-varying means may be provided for altering the normal cycle as required. Such speed-varying means may be in the form of another electric motor, or a variable gear ratio or alternatively the circuit arrangements of the normally-used motor may be altered so that the speed of the rotatable cams operating the associated switches can be varied.

The object of the present invention is to provide new or improved apparatus in which the normal cycle of operations can be altered in a manner in which risk of damage to components controlled by the switches is obviated or considerably reduced.

In accordance with the invention there is provided switch control apparatus of the kind specified wherein the cams or like switch operating members are adapted to be rotated at a normal speed by power-operated means such as an electric motor and at a speed different from normal through the intermediary of speed-varying means, said apparatus being provided with a control member or members for effecting operation of said speed-varying means together with one or more switches or other means which are associated with said control member or members and which are operable to control the operation of one or more of said component controlling switches when the speed varying means are brought into operation.

The invention will now be more particularly described with reference to the accompanying drawing which shows schematically one example of switch control apparatus in accordance with the present invention.

Referring to the example shown in the drawing, the apparatus may be generally constructed as described in our co-pending patent application Serial No. 109,630 dated May 12, 1961.

Thus the apparatus may be provided with a first shaft 10 on which is mounted a plurality of rotatable cams 11 arranged to operate a plurality of electric switches 12 on rotation of said first shaft by any convenient means such as an electric motor 13. Where the invention is applied for use in controlling the operation of a domestic electric washing machine, the aforementioned electric switches 12 would be arranged to control the operation of components such as valves, heaters and solenoids so that a predetermined cycle of washing and/or drying operations will be followed.

It is, however, sometimes desired to alter the normal cycle of operations so that, for example, some parts of the normal cycle are eliminated. For this purpose the apparatus is provided with speed-varying means in the form of an auxiliary motor 14 connected to said first shaft 10 and arranged to increase the speed of rotation thereof over selected parts of the cycle. The first shaft is provided with an arm 15 which carries a set of brushes 16 which are engageable wtih an associated set of conductors 17 and there is also provided a second shaft 18 also provided with an arm 19 carrying a set of brushes 20 which are engageable with a further set of conductors 21. Some at least of the conductors 17 associated with the set of brushes 16 are electrically connected to some at least of the conductors 21 associated with the second set of brushes 20. In use, current is supplied to one at least of the second set of conductors 21 from a source 9 and the second set of brushes 20 can be disposed at any selected angular position by means of a control member 22 so as to connect the energised conductor or conductors with one at least of the other conductors. The latter are connected to the set of conducors 17 associated with the set of brushes 16 which, in turn, are used to conduct current when in a predetermined angular position to a conductor connected electrically to the aforementioned auxiliary motor 14. Thus the set of brushes 16 are rotatable with the first shaft 10 by means of the normally used motor 13 employed in carrying out the normal cycle. When the other set of brushes 20 is used, however, to vary the normal cycle the first set of brushes 16 will act to energise the auxiliary motor 14 during part of the cycle.

In order to prevent the operation of components such as, for example, valves and solenoids during the unwanted part of the cycle the apparatus is provided with one or more switches or other means 23 which are associated with the second set of brushes 20 and which are operable when said set of brushes 20 is brought into use so as to control the operation of one or more of the switches 12 which themselves control said components.

For example, as shown in the drawing, there may be provided on the shaft 18 a cam 24 having notches 25 and adapted to control the switch or switches 23. Thus rotation of the control member 22 will result in rotation of the cam 24 and at certain positions of said cam, one of the notches thereof will be aligned with the switch 23 as shown in the drawing, thereby opening said switch 23. This in turn opens the circuits controlled (in the example shown) by two of the component controlling switches 12, which circuits include respectively a resistive load 26 and an inductive load 27. The said component controlling switches 12 would thereby be rendered ineffective so that the components controlled thereby (indicated by loads 26 and 27) will not be operated during the cycle. Apart from the fact that it may be necessary to prevent these components from operating during the unused part of the cycle the above described arrangement will also reduce or obviate the possibility of damage occurring to the components through their being operated at a speed greater than normal.

It is however to be understood that the switch or switches 23 and the switches 12 can be connected in a variety of ways to produce the desired effect on the cycle of operation of the machine according to the position of the control member 22. Further, the control member 22 may (instead of being in the form of a knob as shown) be replaced by a plurality of control members in the form of push buttons which are arranged to operate a homing motor.

Having thus described our invention what we claim as new and desire to secure by Letters Patent is:

1. Switch control apparatus of the kind specified comprising in combination a rotatable shaft, a plurality of members mounted on said shaft so as to be rotatable therewith, a plurality of switches operable by said members, power-operable means connected to said shaft for imparting rotation thereto at a normal speed, speed-varying means under the control of which said shaft is rotatable at a speed different from said normal speed, a movable control member for actuating said speed-varying means, a cam rotatable by said movable control member and an additional switch actuable by said cam to control the effect of at least one of said first-mentioned switches when said speed-varying means is brought into action.

2. Switch control apparatus as claimed in claim 1 in which said additional switch is connected in series with at least one of said first-mentioned switches.

References Cited in the file of this patent

UNITED STATES PATENTS

| | | |
|---|---|---|
| 2,870,834 | Sisson | Jan. 27, 1959 |
| 2,963,628 | Ostland | Dec. 6, 1960 |